(12) United States Patent
Xiang et al.

(10) Patent No.: US 11,392,258 B2
(45) Date of Patent: Jul. 19, 2022

(54) TOUCH PANEL INCLUDING DIELECTRIC STRUCTURE, DISPLAY PANEL AND DISPLAY DEVICE

(71) Applicant: BOE TECHNOLOGY GROUP CO., LTD., Beijing (CN)

(72) Inventors: Dalin Xiang, Beijing (CN); Yuanyuan Li, Beijing (CN); Meizhu Zheng, Beijing (CN); Zewen Bo, Beijing (CN); Jiuzhen Wang, Beijing (CN); Lina Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/211,057

(22) Filed: Mar. 24, 2021

(65) Prior Publication Data
US 2022/0057900 A1 Feb. 24, 2022

(30) Foreign Application Priority Data

Aug. 21, 2020 (CN) .......................... 202010851850.8

(51) Int. Cl.
*G06F 3/044* (2006.01)
*G02F 1/1333* (2006.01)

(52) U.S. Cl.
CPC ........ *G06F 3/0448* (2019.05); *G02F 1/13338* (2013.01); *G06F 2203/04112* (2013.01)

(58) Field of Classification Search
CPC ........................... G06F 3/0448; G02F 1/13338
See application file for complete search history.

(56) References Cited

U.S. PATENT DOCUMENTS

| | | | |
|---|---|---|---|
| 2013/0021544 A1* | 1/2013 | Fukuyama | G06F 3/0414 349/12 |
| 2017/0123538 A1* | 5/2017 | Kuo | G06F 3/0446 |
| 2017/0131591 A1* | 5/2017 | Rantala | C08K 3/22 |
| 2018/0107298 A1* | 4/2018 | Zhang | G06F 3/0443 |
| 2018/0139853 A1* | 5/2018 | Kim | H05K 1/0306 |

* cited by examiner

*Primary Examiner* — Chun-Nan Lin
(74) *Attorney, Agent, or Firm* — Westman, Champlin & Koehler, P.A.

(57) ABSTRACT

The present application provides a touch panel, a display panel and a display device. The touch panel includes: a base substrate; a first conductive structure on the base substrate; and a dielectric structure on the first conductive structure. The first conductive structure includes: a first electrode structure and a second electrode structure that are spaced apart from each other. A projection of the dielectric structure to the base substrate overlaps at least a part of a projection of the first electrode structure and the second electrode structure to the base substrate.

17 Claims, 6 Drawing Sheets

TOUCH PANEL INCLUDING DIELECTRIC STRUCTURE, DISPLAY PANEL AND DISPLAY DEVICE

CROSS-REFERENCE TO RELATED APPLICATION

The present application claims a priority of the Chinese patent application No. 202010851850.8 filed on Aug. 21, 2020, which is incorporated herein in its entirety.

TECHNICAL FIELD

The present application relates to the field of display technologies, in particular to a touch panel, a display panel and a display device.

BACKGROUND

With the development of flexible technology, higher requirements are put forward for a thickness of stacked layers in a screen. After the screen is thinned, it is more conducive to folding and curling. However, when the thickness of stacked layers in the screen becomes thinner, it may cause problems such as a decrease in touch precision or a decrease in touch sensitivity of a mutual-capacitive touch screen.

SUMMARY

In a first aspect, one embodiment of the present application provides a touch panel including: a base substrate; a first conductive structure on the base substrate; and a dielectric structure on the first conductive structure. The first conductive structure includes: a first electrode structure and a second electrode structure that are spaced apart from each other. A projection of the dielectric structure to the base substrate overlaps at least a part of a projection of the first electrode structure and the second electrode structure to the base substrate.

In a second aspect, one embodiment of the present application provides a display panel, including an encapsulation layer. The encapsulation layer is reused as the base substrate of the touch panel provided in the first aspect.

In a third aspect, one embodiment of the present application provides display device, including: a display structure; and a touch panel. The touch panel includes: a base substrate; a first conductive structure on the base substrate; and a dielectric structure on the first conductive structure. The first conductive structure includes: a first electrode structure and a second electrode structure that are spaced apart from each other. a projection of the dielectric structure to the base substrate overlaps at least a part of a projection of the first electrode structure and the second electrode structure to the base substrate. The base substrate is reused as an encapsulation layer of the display structure.

In a possible embodiment of the present disclosure, the display structure includes a backlight source, a liquid crystal module, and the encapsulation layer that are sequentially stacked; the first conductive structure and the liquid crystal module are at opposite sides of the encapsulation layer.

In a possible embodiment of the present disclosure, the display structure includes an anode layer, a light emitting layer, a cathode layer, and the encapsulation layer that are sequentially stacked; the first conductive structure and the cathode layer are at opposite sides of the encapsulation layer.

It is to be understood that the contents in this section are not intended to identify the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the application and are not to be construed as limiting the application. Wherein.

Figure 1:
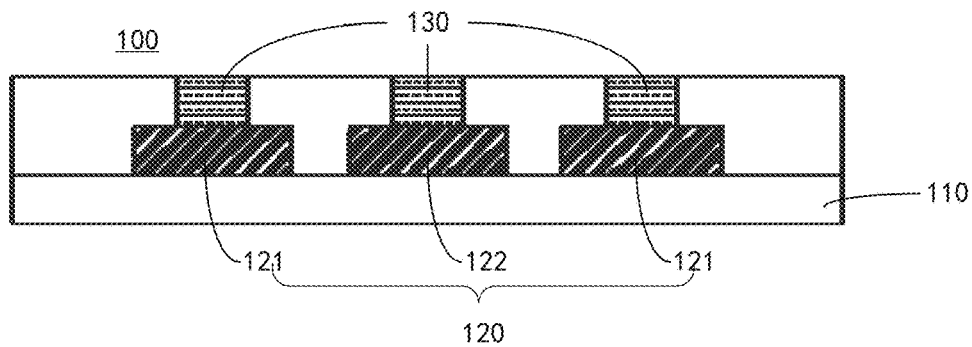
FIG. 1 is a schematic cross-sectional structure diagram of a first example of a touch panel according to an embodiment of the present application.

| Reference numbers | |
|---|---|
| 100-touch panel; | 110-base substrate; |
| 120-first conductive structure; | 121-first electrode structure; |
| 122-second electrode structure; | 130-dielectric structure; |
| 131-first dielectric substructure; | 132-second dielectric substructure; |
| 140-insulating layer; | 141-conductive plug; |
| 150-second conductive structure; | 200-display panel; |
| 201-sub-pixel aperture; | 202-sub-pixel; |
| 210a-encapsulation layer; | 220a-liquid crystal module; |
| 230a-backlight source; | 210b-encapsulation layer; |
| 220b-cathode layer; | 230b-light-emitting layer; |
| 240b-anode layer; | 300-polarizer; |
| 400-cover plate. | |

DETAILED DESCRIPTION

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

The terms such as "first" and "second" in the specification and claims of the present application are merely used to differentiate similar components rather than to represent any order or sequence. It is to be understood that the data so used may be interchanged where appropriate, such that the embodiments of the present application described herein may be implemented in a sequence other than those illustrated or described herein. In addition, the terms "include" and "have" or their variations are intended to encompass a non-exclusive inclusion, such that a process, method, system, product, or device that include a series of steps or units include not only those steps or units that are explicitly listed but also other steps or units that are not explicitly listed, or steps or units that are inherent to such process, method, product, or device. In the specification and claims, "and/or" means at least one of the connected objects.

The inventors of the present application has conducted research and found that when the thickness of stacked layers in the screen becomes thinner, it may cause problems such as a decrease in touch precision or a decrease in touch sensitivity of a mutual-capacitive touch screen. Especially in a case of weak grounding (the weak grounding means that consistency deviation of a human body and a touch screen in common grounding state is large, for example, non-handheld scenarios such as an electronic device on an insulated desktop; good grounding means that consistency deviation of a human body and a touch screen in common grounding state is small, for example, holding a device or a device located on an object with good conductivity), when multi-finger or large-area touch occurs (with a touch area being less than 2.5 square centimeters), the touch is reflected as touch failure phenomena, such as false reporting, over-reporting, disconnection.

The reason for this failure phenomenon is that: in a weak grounding state, an ability of a finger for transferring charges becomes weak, and when a thumb is pressed or the multi-finger coaxial touch occurs, retransmission effect of mutual capacitive touch becomes stronger and then a mutual capacitance change amount (ACm) becomes smaller or even zero (the larger the touch area, the more obvious such phenomenon), and then a touch circuit cannot detect capacitance change of a touch point, thus touch failure phenomena such as false reporting and over-reporting occurs.

The present application provides a touch panel, a display panel and a display device, which can solve the foregoing technical problems in the related art.

The technical solutions of the present application and how the technical solutions of the present application solve the foregoing technical problems are described hereinafter in details with specific embodiments.

One embodiment of the present application provides a touch panel 100. As shown in FIG. 1, the touch panel 100 includes a base substrate 110, a first conductive structure 120, and a dielectric structure 130 stacked in sequence.

The first conductive structure 120 includes: a first electrode structure 121 and a second electrode structure 122 that are spaced apart from each other.

A projection of the dielectric structure 130 to the base substrate 110 overlaps at least a part of a projection of the first electrode structure 121 and the second electrode structure 122 to the base substrate 110.

In the touch panel 100 provided in this embodiment, the first electrode structure 121 and the second electrode structure 122 included in the first conductive structure 120 may be used as a driving channel and a sensing channel for carrying touch signals, respectively.

The projection of the dielectric structure 130 to the base substrate 110 overlapping at least part of the projection of the first electrode structure 121 and the second electrode structure 122 to the base substrate 110, means that the dielectric structure 130 at least covers at least part of one side of the first electrode structure 121 and the second electrode structure 122 away from the base substrate 110. In this way, during touch, parasitic capacitance between a finger and the first electrode structure 121 as well as the second electrode structure 122 can be reduced, that is, the "Retransmission" capacitance is reduced, thereby enhancing a mutual capacitance change amount between the first electrode structure 121 and the second electrode structure 122 and then improving touch accuracy and touch sensitivity.

In one embodiment as shown in FIG. 1, the projection of the dielectric structure 130 to the base substrate 110 may be within the projection of the first electrode structure 121 and the second electrode structure 122 to the base substrate 110; and an area of the projection of the dielectric structure 130 to the base substrate 110 may be less than an area of the projection of the first electrode structure 121 and the second electrode structure 122 to the base substrate 110.

Figure 2:
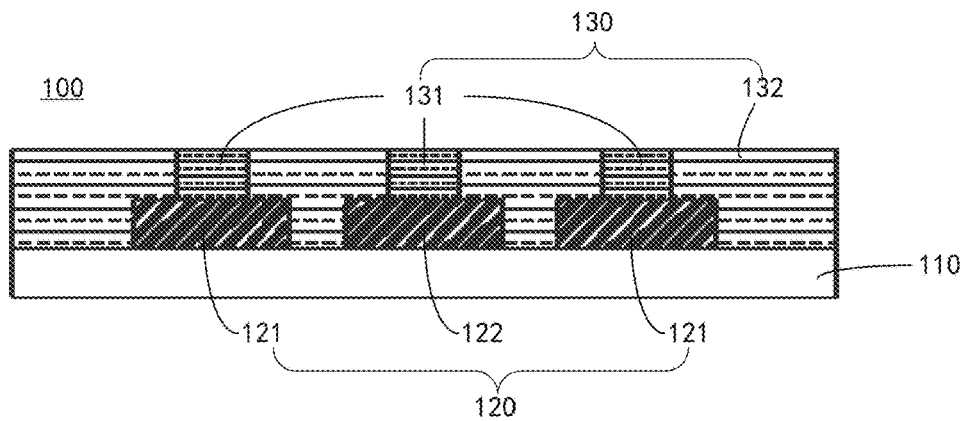
FIG. 2 is a schematic cross-sectional structure diagram of a second example of a touch panel according to an embodiment of the present application.

In some possible embodiments, as shown in FIG. 2, the dielectric structure 130 includes: a first dielectric substructure 131 and a second dielectric substructure 132.

A projection of the first dielectric substructure 131 to the base substrate 110 overlaps a part of the projection of the first electrode structure 121 and the second electrode structure 122 to the base substrate 110.

A projection of the second dielectric substructure 132 to the base substrate 110 overlaps a projection of an interval between the first electrode structure 121 and the second electrode structure 122 to the base substrate 110.

In this embodiment, the dielectric structure 130 includes two parts with different dielectric constants, namely, the first dielectric substructure 131 and the second dielectric substructure 132.

Optionally, a dielectric constant of the second dielectric substructure 132 is greater than a dielectric constant of the first dielectric substructure 131.

The first dielectric substructures 131 each with a relatively small dielectric constant are on the first electrode structure 121 and the second electrode structure 122 in a one-to-one manner, and each covers at least one part of one side of the first electrode structure 121 or the second electrode structure 122 away from the base substrate 110. In this way, it can reduce the parasitic capacitance between a finger and the first electrode structure 121 as well as the second electrode structure 122 during touch, i.e., reducing "Retransmission" capacitance, thereby enhancing a mutual capacitance change amount between the first electrode structure 121 and the second electrode structure 122 and then improving touch accuracy and touch sensitivity.

The second dielectric substructure 132 with a relatively large dielectric constant is filled at least in the interval between the first electrode structure 121 and the second electrode structure 122, thereby increasing an electric field intensity between the first electrode structure 121 and the second electrode structure 122, increasing the mutual capacitance change amount between the first electrode structure 121 and the second electrode structure 122 when a touch occurs, and further improving touch accuracy and touch sensitivity.

Optionally, the projection of the second dielectric substructure 132 in the dielectric structure 130 to the base substrate 110 is further overlapped with at least part of the projection of the first electrode structure 121 and the second electrode structure 122 to the base substrate 110. The projection of the second dielectric substructure 132 to the base substrate 110 further covers at least part of the base substrate 110 that is not covered by the projection of the first conductive structure 120. That is, the second dielectric substructure 132 in the dielectric structure 130 further covers another part of one side of the first electrode structure 121 and the second electrode structure 122 away from the base substrate 110, as well as the part of the base substrate 110 that is not covered by the first conductive structure 120. In this way, the presence of the second dielectric substructure 132 can make a film layer where the dielectric structure 130 is located flat, thereby facilitating for manufacturing of other film layers in the semiconductor process.

In one embodiment as shown in FIG. 2, a surface of the second dielectric substructure 132 away from the base substrate 110 is coplanar with a surface of the first dielectric substructure 131 away from the base substrate 110, so that a surface of the dielectric structure 130 away from the base substrate 110 is a plane.

The embodiment of the present application further provides the following possible implementation manners for the first dielectric substructure 131 to ensure that resistance between the finger and the first electrode structure 121 as well as the second electrode structure 122 can be effectively increased during touch, thereby increasing touch accuracy and touch sensitivity.

Optionally, an overlap ratio of the projections of the first dielectric substructure 131 and the first electrode structure 121 to the base substrate 110 is not less than 0.1 and not greater than 0.9. In this embodiment, the first dielectric sub-structure 131 does not completely cover the first electrode structure 121, so as to expose a first portion of the first electrode structure 121 close to the second electrode structure 122. The first portion of the first electrode structure 121 has a greater contribution to the electric field between the first electrode structure 121 and the second electrode structure 122, which can increase intensity of electric field lines and increase the mutual capacitance change amount. A second portion of the first electrode structure 121 away from the second electrode structure 122 has a smaller contribution to variation of the electric field lines with a large retransmission amount. Thus, the second portion of the first electrode structure 121 is covered by the first dielectric substructure 131, thereby reducing the retransmission capacitance.

Optionally, an overlap ratio of the projections of the first dielectric substructure 131 and the second electrode structure 122 to the base substrate 110 is not less than 0.1 and not greater than 0.9. The principle of this embodiment is the same as above, and will not be repeated here.

It should be noted that the foregoing overlap ratio refers to a ratio of an area of the first dielectric substructure 131 to an area of the first electrode structure 121, or a ratio of the area of the first dielectric substructure 131 to an area of the second electrode structure 122.

Figure 4:
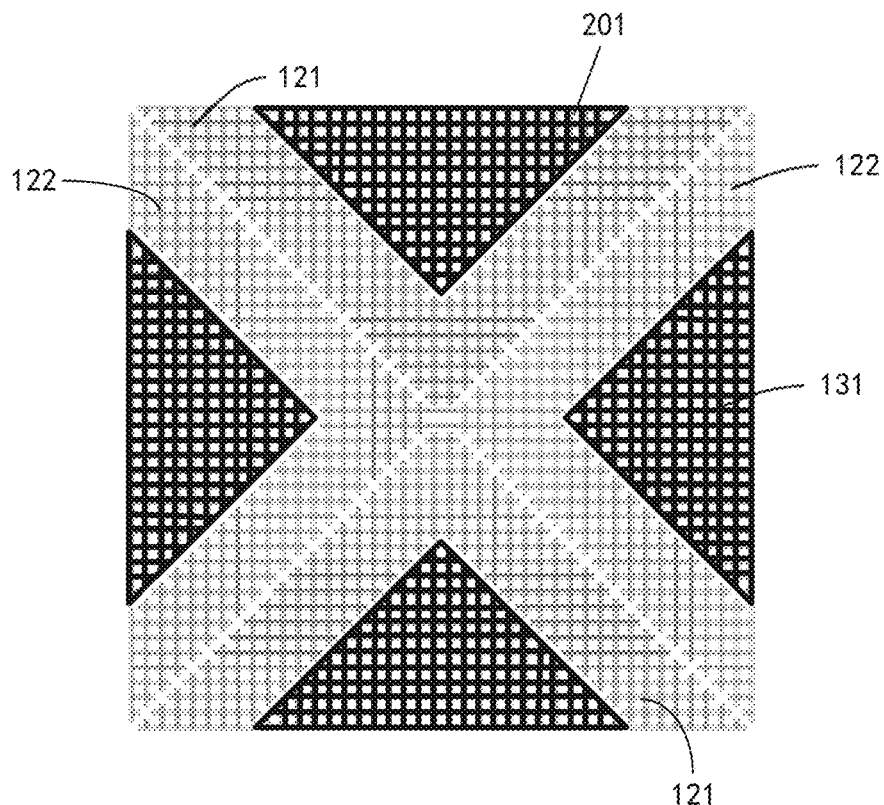
FIG. 4 is a schematic top view of a fourth example of a touch panel according to an embodiment of the present application.
Figure 5:
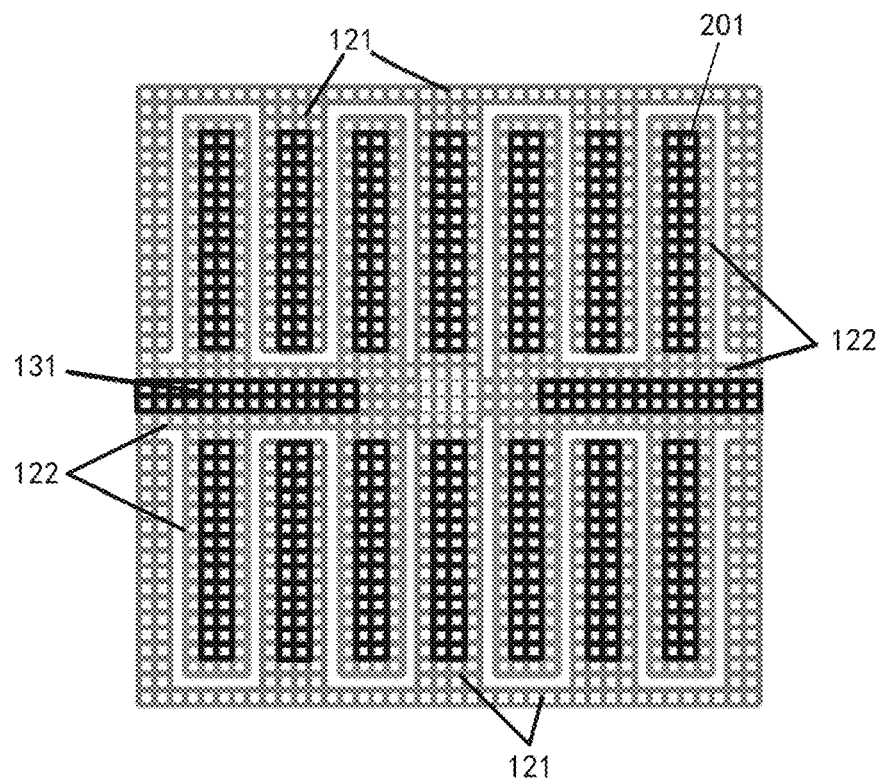
FIG. 5 is a schematic top view of a fifth example of a touch panel according to an embodiment of the present application.

In some possible embodiments, a wiring shape of the first electrode structure 121 and the second electrode structure 122 is a rhombus (as shown in FIG. 4) or an interdigital shape (as shown in FIG. 5).

It should be noted that the foregoing wiring shape refers to a shape of the projection of the first electrode structure 121 and the second electrode structure 122 to a plane where any film layer (for example, the base substrate 110) is located.

In some possible embodiments, as shown in FIG. 4 and FIG. 5, at least one of the first electrode structure 121 and the second electrode structure 122 is a mesh electrode structure. A hollow portion of the mesh electrode structure is corresponding to at least one sub-pixel aperture 201 of the display panel 200.

In this embodiment, in a case that at least one of the first electrode structure 121 and the second electrode structure 122 is a mesh electrode structure, wires can be routed at intervals between adjacent sub-pixels 202. That is, wiring at a corresponding non-display area of the display panel 200 facilitates superposition of a display surface and a touch surface of the display panel.

Figure 6:
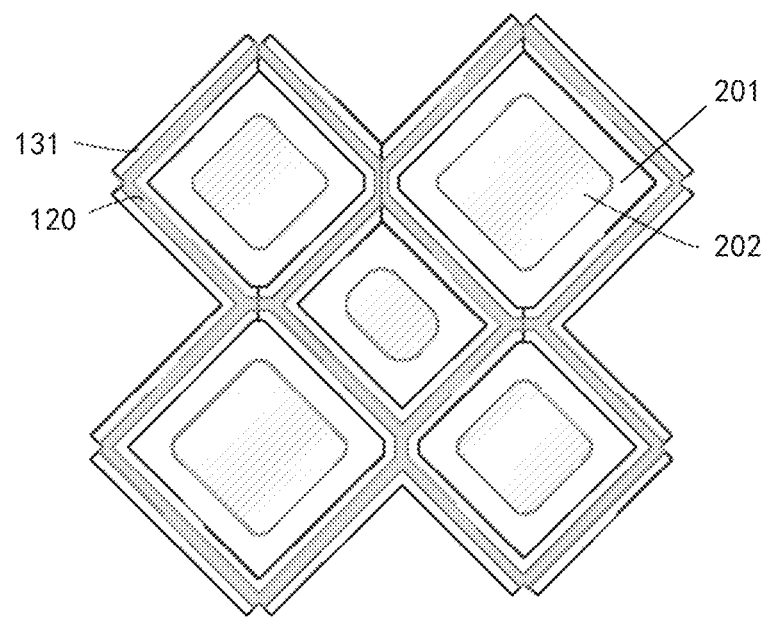
FIG. 6 is a schematic top view of a first example of a display panel according to an embodiment of the present application.
Figure 7:
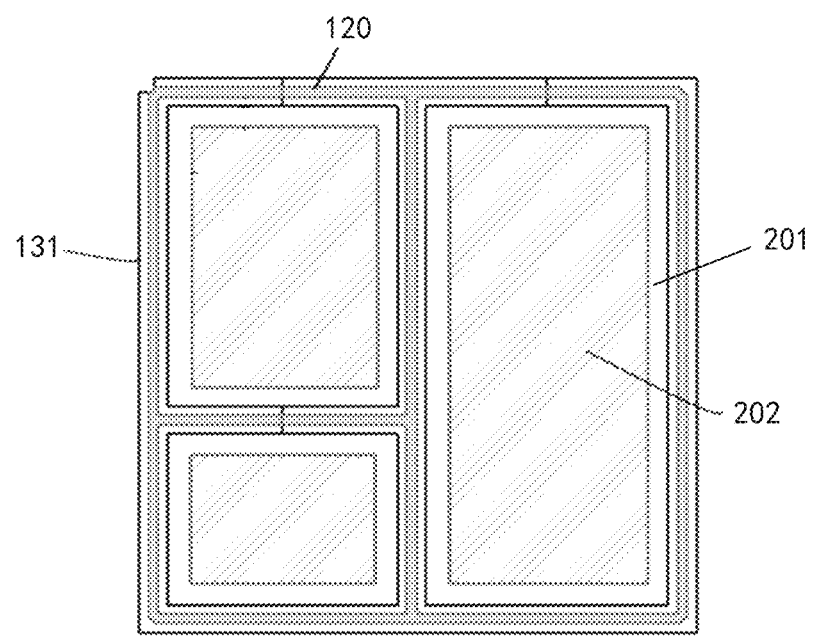
FIG. 7 is a schematic top view of a second example of a display panel according to an embodiment of the present application.

In some possible implementations, as shown in FIG. 6 and FIG. 7, the first dielectric substructure 131 is a mesh dielectric substructure. A width of any mesh line of the mesh dielectric substructure is not less than 0.1 times a width of a corresponding mesh line of the mesh electrode structure, and is not greater than a distance between two adjacent sub-pixel apertures 201. FIG. 6 shows a green-green-red-blue (GGRB) pixel structure. FIG. 7 shows a red-green-blue (RGB) pixel structure. For example, in the first electrode structure 121 of a mesh shape or the second electrode structure 122 of a mesh shape, a width of a single mesh line is 3 μm; a width of a single mesh line in the first dielectric substructure 131 is 6 μm. FIG. 6 and FIG. 7 are enlarged views of partial areas of the touch panel 100 including the first dielectric substructure 131 in FIG. 4 and FIG. 5. FIG. 6 or FIG. 7 shows that a width of a single mesh line in the first dielectric substructure 131 of a mesh shape, may be greater than a width of a single mesh line in the first electrode structure 121 of a mesh shape or the second electrode structure 122 of a mesh shape.

Optionally, at least part of the projection of the second dielectric substructure 132 to the base substrate 110 overlaps a projection of at least one sub-pixel aperture 201 to the base substrate 110. That is, at least part of the second dielectric substructure 132 is used to cover the at least one sub-pixel aperture 201. In this way, sub-pixels 202 can be used to increase an electric field intensity between the first electrode structure 121 and the second electrode structure 122, and increase mutual capacitance change amount between the first electrode structure 121 and the second electrode structure 122 when a touch occurs, and further improve touch accuracy and touch sensitivity.

Figure 3:
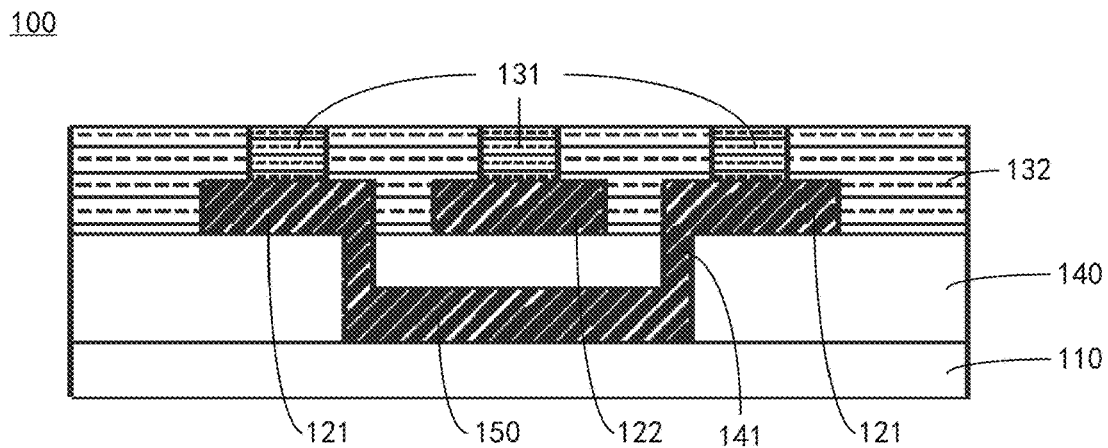
FIG. 3 is a schematic cross-sectional structure diagram of a third example of a touch panel according to an embodiment of the present application.

In some possible implementations, as shown in FIG. 3, the touch panel 100 further includes: an insulating layer 140 and a second conductive structure 150.

The insulating layer 140 is located between the base substrate 110 and the first conductive structure 120. The insulating layer 140 has a conductive plug 141.

The second conductive structure 150 is located between the base substrate 110 and the insulating layer 140.

At least two first electrode structures 121 are electrically coupled with the second conductive structure 150 through the conductive plugs 141, respectively; or, at least two second electrode structures 122 are electrically coupled with the second conductive structure 150 through the conductive plugs 141, respectively.

In this embodiment, two first electrode structures 121 or two second electrode structures 122 can be bridged by the conductive plugs 141 and the second conductive structure 150, respectively.

It can be understood that a size of the second conductive structure 150 can be selected as required to adapt to the bridging of two electrode structures or the bridging of the multiple electrode structures.

Based on the same inventive concept, one embodiment of the present application provides a display panel. As shown in FIG. 6 to FIG. 9, the display pane includes an encapsulation layer.

The encapsulation layer is reused as the base substrate 110 in the touch panel 100 provided in any of the foregoing embodiments.

In this embodiment, the display panel is used to display images, and the touch panel 100 is used to implement human-machine interactive operations.

Optionally, the base substrate 110 of the touch panel 100 and a part of the display panel 200 may share a film structure, thereby facilitating the thinning of the display panel.

In some possible embodiments, as shown in FIG. 6 and FIG. 7, at least one of the first electrode structure 121 and the second electrode structure 122 of the touch panel 100 is a mesh electrode structure; a hollow portion of the mesh electrode structure is corresponding to at least one sub-pixel aperture 201 of the display panel 200.

In some possible implementations, at least part of the second dielectric substructure 132 of the touch panel 100 covers at least one sub-pixel aperture 201.

Figure 8:
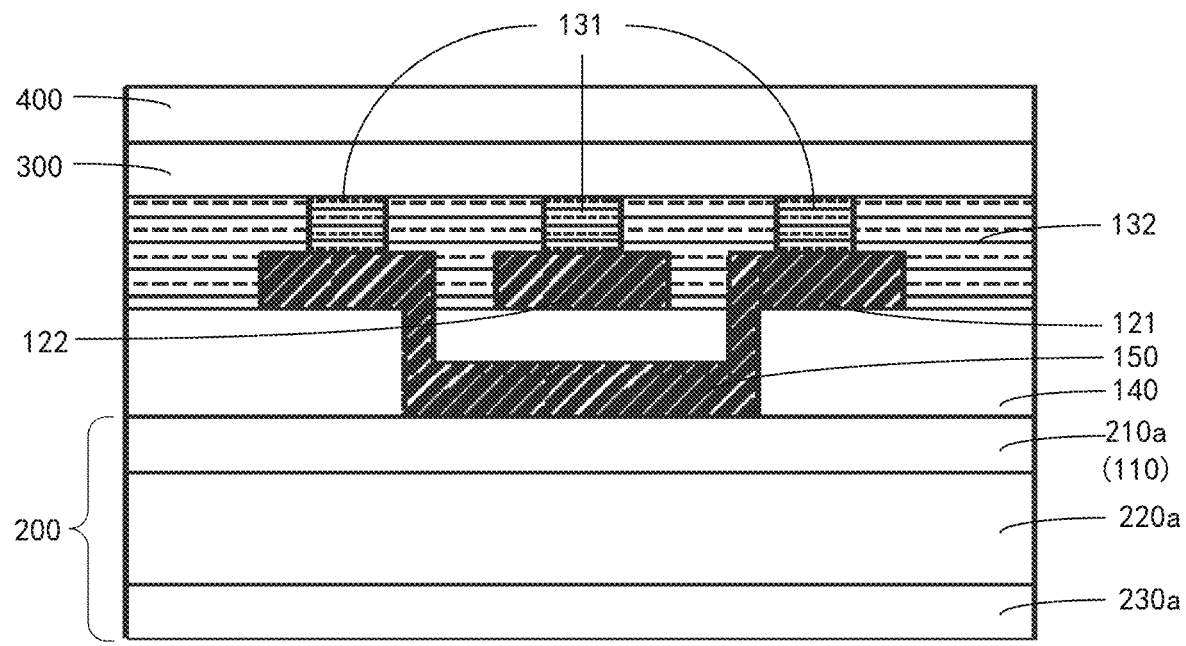
FIG. 8 is a schematic cross-sectional structure diagram of a third example of a display panel according to an embodiment of the present application.

In some possible implementations, as shown in FIG. 8, the display panel 200 includes a backlight source 230a, a liquid crystal module 220a, and an encapsulation layer 210a that are sequentially stacked. The encapsulation layer 210a is located at other side of the base substrate 110 of the touch panel 100.

In this embodiment, the display panel 200 may adopt a liquid crystal display (LCD) display structure.

Optionally, the base substrate 110 of the touch panel 100 and the encapsulation layer 210a of the LCD display structure may be the same film layer.

Figure 9:
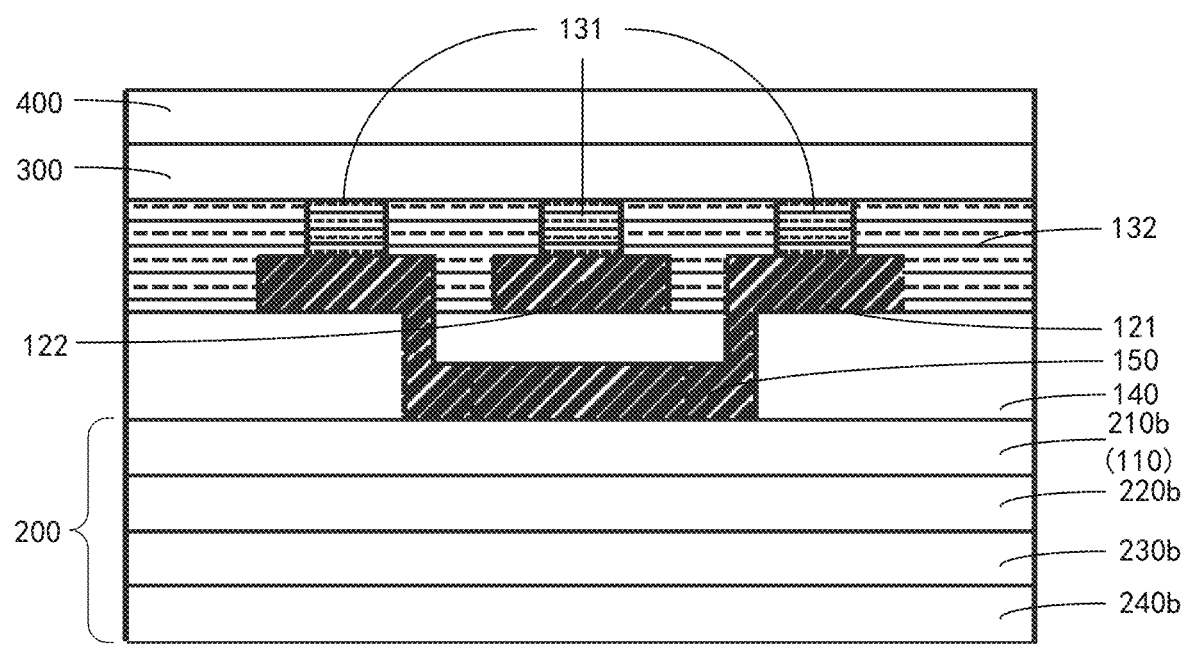
FIG. 9 is a schematic cross-sectional structure diagram of a fourth example of a display panel according to an embodiment of the present application.

In some possible embodiments, as shown in FIG. 9, the display panel 200 includes an anode layer 240b, a light emitting layer 230b, a cathode layer 220b, and an encapsulation layer 210b that are sequentially stacked. The encapsulation layer 210b is at other side of the base substrate 110 of the touch panel 100.

In this embodiment, the display panel 200 may adopt a display structure such as light emitting diode (LED), micro light emitting diode (Micro-LED), or organic light emitting diode (OLED) display structure.

Optionally, the base substrate 110 of the touch panel 100 and the encapsulation layer 210b of the LED, Micro-LED or OLED display structure may be the same film layer.

Based on the same inventive concept, one embodiment of the present application provides a display device, including: the touch panel 100 provided in any of the foregoing embodiments; or, the display panel provided in any of the foregoing embodiments.

In this embodiment, since the display device adopts any touch panel 100 provided in the foregoing embodiments or any display panel provided in the foregoing embodiments, its principle and technical effects refer to the foregoing embodiments and will not be repeated here.

Figure 10:
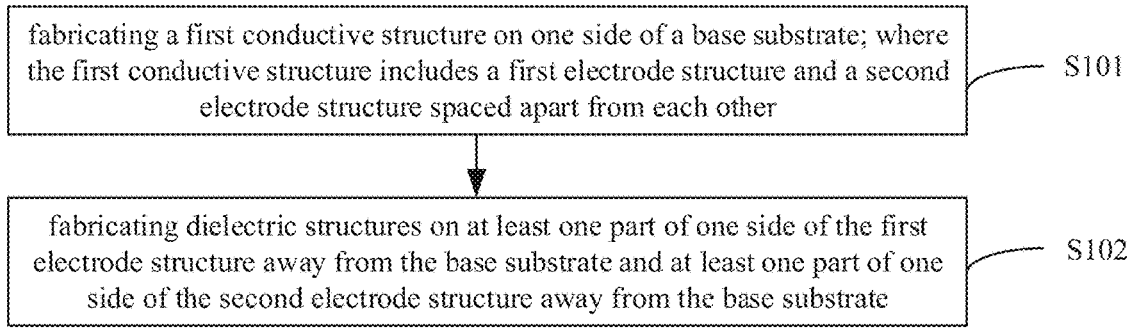
FIG. 10 is a schematic flowchart of a method of manufacturing a touch panel according to an embodiment of the present application.

Based on the same inventive concept, one embodiment of the present application provides a method for manufacturing a touch panel 100. A flowchart of the method is shown in FIG. 10. The method includes steps S101-S102.

S101: fabricating a first conductive structure on one side of a base substrate; where the first conductive structure includes a first electrode structure and a second electrode structure spaced apart from each other.

As shown in FIG. 1, in the first conductive structure 120 fabricated by this step, the first electrode structure 121 and the second electrode structure 122 may be used as a driving channel and a sensing channel for carrying touch signals, respectively.

S102: fabricating dielectric structures on at least one part of one side of the first electrode structure away from the base substrate and at least one part of one side of the second electrode structure away from the base substrate.

As shown in FIG. 1, dielectric substructures 130 fabricated by this step are on the first electrode structure 121 and the second electrode structure 122 in a one-to-one manner, and each covers at least one part of one side of the first electrode structure 121 or the second electrode structure 122 away from the base substrate 110. In this way, it can reduce the parasitic capacitance between a finger and the first electrode structure 121 as well as the second electrode structure 122 during touch, i.e., reducing "Retransmission" capacitance, thereby enhancing a mutual capacitance change amount between the first electrode structure 121 and the second electrode structure 122 and then improving touch accuracy and touch sensitivity.

Figure 11:
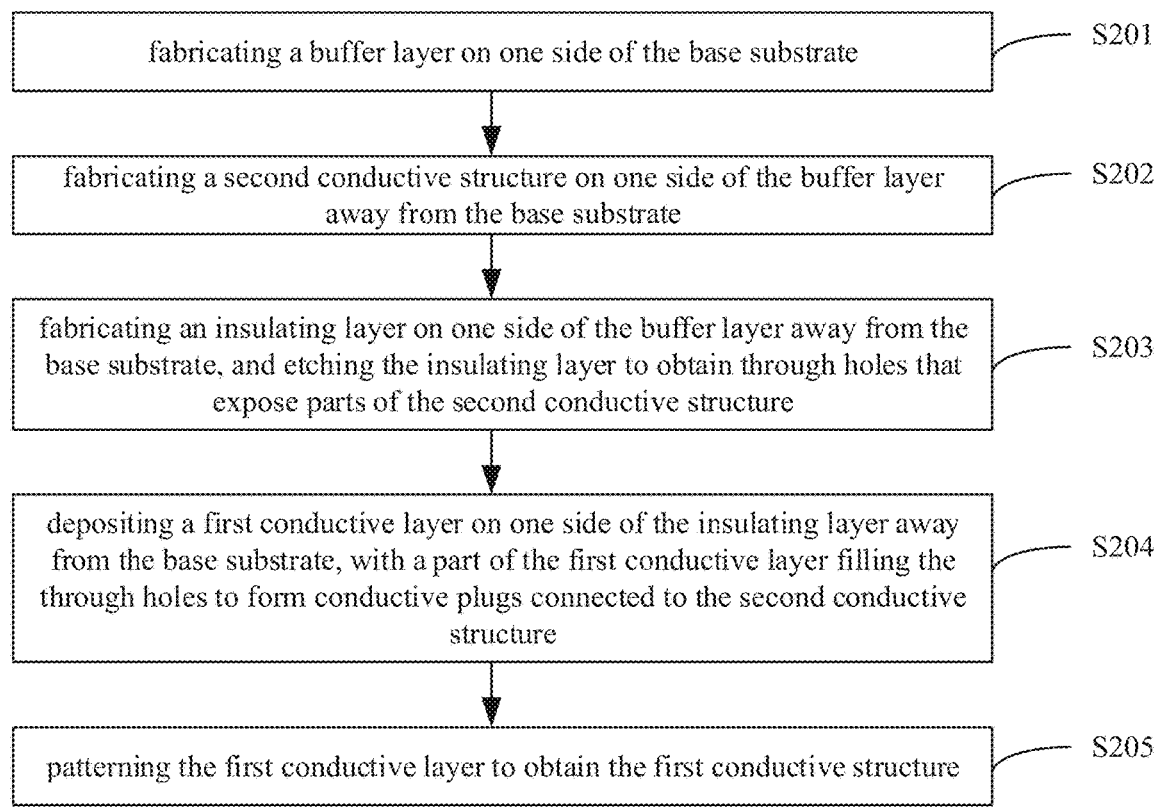
FIG. 11 is a schematic flowchart of manufacturing a first conductive structure on one side of a base substrate in a method of manufacturing a touch panel according to an embodiment of the present application.

The embodiment of the present application further provides a method for fabricating the first conductive structure on one side of the base substrate in the foregoing step S101. A flowchart of the method is shown in FIG. 11. The method includes the following steps S201-S205.

S201: fabricating a buffer layer on one side of the base substrate.

In this step, a coating process may be used to fabricate a buffer layer on one side of the base substrate 110.

Optionally, the buffer layer may be made of an organic insulating material or an inorganic insulating material. The organic insulating material may include optically clear adhesive. The inorganic insulating material may include silicon nitride.

Optionally, a thickness of the buffer layer is not less than 1 nanometer and not greater than 100 nanometers.

S202: fabricating a second conductive structure on one side of the buffer layer away from the base substrate.

In this step, a metal deposition process may be used to obtain a second conductive layer, and then the second conductive layer may be patterned and etched to obtain the second conductive structure.

Optionally, as shown in FIG. 3, the second conductive structure 150 may be made of any one of titanium-aluminum-titanium, silver, and copper materials.

Optionally, a thickness of the second conductive structure 150 is not less than 1 nanometer and not greater than 100 nanometers.

S203: fabricating an insulating layer on one side of the buffer layer away from the base substrate, and etching the insulating layer to obtain through holes that expose parts of the second conductive structure.

In this step, as shown in FIG. 3, an insulating layer 140 may be formed on one side of the buffer layer away from the base substrate 110 by a coating process, and the insulating layer 140 completely covers the second conductive structure 150. Then, the insulating layer 140 is etched by a photolithography process to obtain through holes that expose parts of the second conductive structure 150.

S204: depositing a first conductive layer on one side of the insulating layer away from the base substrate, with a part of the first conductive layer filling the through holes to form conductive plugs connected to the second conductive structure.

In this step, as shown in FIG. 3, the metal deposition process may also be used to obtain the first conductive layer. During the metal deposition process, metal material enters the through holes of the insulating layer 140 and contacts the second conductive structure 150, thereby forming conductive plugs 141 in the through holes of the insulating layer 140. The conductive plugs 141 electrically connects the second conductive structure 150 to the first conductive layer.

S205: patterning the first conductive layer to obtain the first conductive structure.

In this step, a patterned etching process may be performed on the first conductive layer.

Optionally, the patterning the first conductive layer to obtain the first conductive structure in the step S205 includes: patterning the first conductive layer to obtain a first electrode structure and a second electrode structure; where at least one of the first electrode structure and the second electrode structure is a mesh electrode structure, and a hollow portion of the mesh electrode structure is corresponding to at least one sub-pixel aperture of the display panel.

Optionally, as shown in FIG. 3, both the first electrode structure 121 and the second electrode structure 122 may be made of any one of titanium-aluminum-titanium, silver, and copper materials.

Optionally, a thickness of each of the first electrode structure 121 and the second electrode structure 122 is not less than 1 nanometer and not greater than 100 nanometers.

Figure 12:
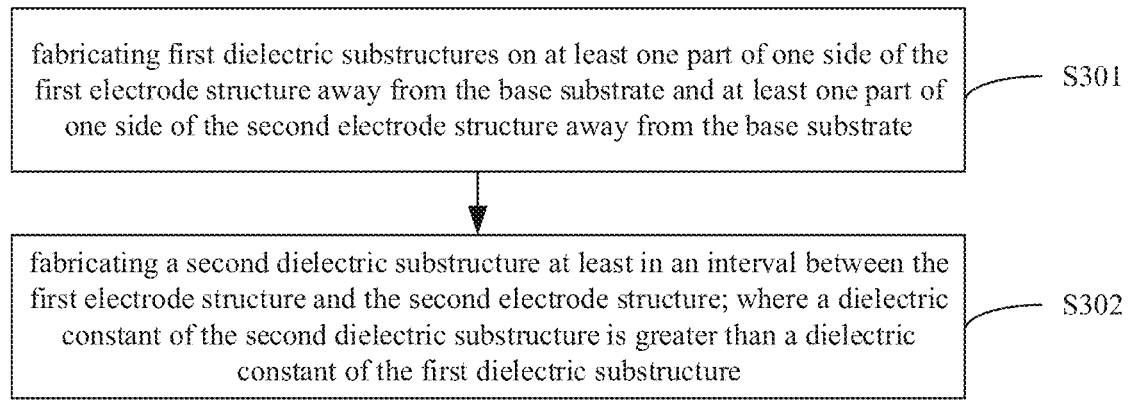
FIG. 12 is a schematic flowchart of manufacturing a dielectric structure at least on a part of a first electrode structure away from a base substrate and a part of a second electrode structure away from the base substrate in a method of manufacturing a touch panel according to an embodiment of the present application.

The embodiment of the present application further provides a method for fabricating dielectric structures on at least one part of one side of the first electrode structure away from the base substrate and at least one part of one side of the second electrode structure away from the base substrate in the foregoing step S102. A flowchart of the method is shown in FIG. 12. The method includes the following steps S301-S302.

S301: fabricating first dielectric substructures on at least one part of one side of the first electrode structure away from the base substrate and at least one part of one side of the second electrode structure away from the base substrate.

In this step, according to material characteristics of the first dielectric substructure 131, a coating or deposition process may be used to form a first dielectric sublayer on one side of the first conductive structure 120 away from the base substrate 110, and then the first dielectric sublayer is patterned and etched to obtain the first dielectric substructure 131.

Optionally, the fabricating first dielectric substructures on at least one part of one side of the first electrode structure away from the base substrate and at least one part of one side of the second electrode structure away from the base substrate in the foregoing step S301, further includes: patterning the first dielectric substructures to obtain a mesh dielectric substructure; where a width of any mesh line of the mesh dielectric substructure is not less than 0.1 times a width of a corresponding mesh line of the mesh electrode structure, and is not greater than a distance between two adjacent sub-pixel apertures.

Optionally, a thickness of the first dielectric substructure 131 is not less than 1 nanometer and not greater than 1000 micrometers.

S302: fabricating a second dielectric substructure at least in an interval between the first electrode structure and the second electrode structure; where a dielectric constant of the second dielectric substructure is greater than a dielectric constant of the first dielectric substructure.

In this step, according to material properties of the second dielectric substructure 132, a coating or deposition process may be used to form a second dielectric sublayer on one side of the first conductive structure 120 away from the base substrate 110, and then the second dielectric sublayer is patterned and etched to obtain the second dielectric substructure 132.

Optionally, the fabricating a second dielectric substructure at least in an interval between the first electrode structure and the second electrode structure in the foregoing step S302, includes: fabricating the second dielectric substructure on another part of one side of the first electrode structure and the second electrode structure away from the base substrate, as well as the part of the base substrate that is not covered by the first conductive structure; where at least part of the second dielectric substructure is used to cover the at least one sub-pixel aperture.

By applying the embodiments of the present application, at least one of the following beneficial effects can be achieved.

First, in the touch panel 100, the first electrode structure 121 and the second electrode structure 122 included in the first conductive structure 120 can be used as a driving channel and a sensing channel for carrying touch signals, respectively.

Second, the projection of the dielectric structure 130 to the base substrate 110 overlaps at least part of the projection of the first electrode structure 121 and the second electrode structure 122 to the base substrate 110, that is, the dielectric structure 130 at least covers at least part of one side of the first electrode structure 121 and the second electrode structure 122 away from the base substrate 110. In this way, during touch, parasitic capacitance between a finger and the first electrode structure 121 as well as the second electrode structure 122 can be reduced, that is, the "Retransmission" capacitance is reduced, thereby enhancing a mutual capacitance change amount between the first electrode structure 121 and the second electrode structure 122 and then improving touch accuracy and touch sensitivity.

Third, the dielectric structure 130 includes two parts with different dielectric constants, namely, the first dielectric substructure 131 and the second dielectric substructure 132. The first dielectric substructures 131 each with a relatively small dielectric constant are on the first electrode structure 121 and the second electrode structure 122 in a one-to-one manner, and each covers at least one part of one side of the first electrode structure 121 and the second electrode structure 122 away from the base substrate 110. In this way, it can reduce the parasitic capacitance between a finger and the first electrode structure 121 as well as the second electrode structure 122 during touch, i.e., reducing "Retransmission" capacitance, thereby enhancing a mutual capacitance change amount between the first electrode structure 121 and the second electrode structure 122 and then improving touch accuracy and touch sensitivity. The second dielectric substructure 132 with a relatively large dielectric constant is filled at least in the interval between the first electrode structure 121 and the second electrode structure 122, thereby increasing an electric field intensity between the first electrode structure 121 and the second electrode structure 122, increasing the mutual capacitance change amount between the first electrode structure 121 and the second electrode structure 122 when a touch occurs, and further improving touch accuracy and touch sensitivity.

Fourth, in a case that at least one of the first electrode structure 121 and the second electrode structure 122 is a mesh electrode structure, wires can be routed at intervals between adjacent sub-pixels 202. That is, wiring at a corresponding non-display area of the display panel 200 facilitates superposition of a display surface and a touch surface of the display panel.

Fifth, at least part of the projection of the second dielectric substructure 132 to the base substrate 110 overlaps a projection of at least one sub-pixel aperture 201 to the base substrate 110. That is, at least part of the second dielectric substructure 132 is used to cover the at least one sub-pixel aperture 201. In this way, sub-pixels 202 can be used to increase an electric field intensity between the first electrode structure 121 and the second electrode structure 122, and increase mutual capacitance change amount between the first electrode structure 121 and the second electrode structure 122 when a touch occurs, and further improve touch accuracy and touch sensitivity.

Sixth, two first electrode structures 121 or two second electrode structures 122 can be bridged by the conductive plugs 141 and the second conductive structure 150, respectively.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Such words as "comprises" or "include" mean that an element or object appearing before the word covers elements or objects listed after the word and their equivalents, but do not exclude other elements or objects. Similarly, such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

It will be understood that when an element such as a layer, film, region, or substrate is referred to as being "on" or "under" another element, this element may be "directly" on or "under" the other element, or, there may be an intermediate element therebetween.

In the description of the above embodiments, specific features, structures, materials or characteristics may be combined in any suitable manner in any one or more embodiments or examples.

The above are merely the embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure. The protection scope of the present disclosure shall be subject to the protection scope of the claims.

What is claimed is:

1. A touch panel, comprising:
a base substrate;
a first conductive structure on the base substrate; and
a dielectric structure on the first conductive structure;
wherein the first conductive structure includes: a first electrode structure and a second electrode structure that are spaced apart from each other;
a projection of the dielectric structure to the base substrate overlaps at least a part of a projection of the first electrode structure and the second electrode structure to the base substrate,
wherein the dielectric structure includes a first dielectric substructure and a second dielectric substructure;
a projection of the first dielectric substructure to the base substrate overlaps a part of the projection of the first electrode structure and the second electrode structure to the base substrate;
a projection of the second dielectric substructure to the base substrate overlaps a projection of an interval between the first electrode structure and the second electrode structure to the base substrate,
wherein a dielectric constant of the second dielectric substructure is greater than a dielectric constant of the first dielectric substructure.

2. The touch panel of claim 1, wherein the projection of the second dielectric substructure to the base substrate is further overlapped with at least part of the projection of the first electrode structure and the second electrode structure to the base substrate;
the projection of the second dielectric substructure to the base substrate further covers at least part of the base substrate that is not covered by the projection of the first conductive structure.

3. The touch panel of claim 1, wherein an overlap ratio of the projections of the first dielectric substructure and the first electrode structure to the base substrate is not less than 0.1 and not greater than 0.9.

4. The touch panel of claim 3, wherein an overlap ratio of the projections of the first dielectric substructure and the second electrode structure to the base substrate is not less than 0.1 and not greater than 0.9.

5. The touch panel of claim 1, wherein a wiring shape of the first electrode structure and the second electrode structure is a rhombus or an interdigital shape.

6. The touch panel of claim 5, wherein at least one of the first electrode structure and the second electrode structure is a mesh electrode structure; a hollow portion of the mesh electrode structure is corresponding to at least one sub-pixel aperture of a display panel.

7. The touch panel of claim 6, wherein the first dielectric substructure is a mesh dielectric substructure;
a width of any mesh line of the mesh dielectric substructure is not less than 0.1 times a width of a corresponding mesh line of the mesh electrode structure, and is not greater than a distance between two adjacent sub-pixel apertures.

8. The touch panel of claim 7, wherein at least part of the projection of the second dielectric substructure to the base substrate overlaps a projection of at least one sub-pixel aperture to the base substrate.

9. The touch panel of claim 1, wherein a surface of the second dielectric substructure away from the base substrate is coplanar with a surface of the first dielectric substructure away from the base substrate.

10. The touch panel of claim 1, wherein the touch panel further includes: an insulating layer and a second conductive structure;

the insulating layer is located between the base substrate and the first conductive structure; the insulating layer has a conductive plug;

the second conductive structure is located between the base substrate and the insulating layer;

at least two first electrode structures are electrically coupled with the second conductive structure through the conductive plugs, respectively; or, at least two second electrode structures are electrically coupled with the second conductive structure through the conductive plugs, respectively.

11. The touch panel of claim 1, wherein the projection of the dielectric structure to the base substrate is within the projection of the first electrode structure and the second electrode structure to the base substrate; and an area of the projection of the dielectric structure to the base substrate is less than an area of the projection of the first electrode structure and the second electrode structure to the base substrate.

12. A display device, comprising:
a display structure; and
a touch panel;
wherein the touch panel includes:
a base substrate;
a first conductive structure on the base substrate; and
a dielectric structure on the first conductive structure;
wherein the first conductive structure includes: a first electrode structure and a second electrode structure that are spaced apart from each other;
a projection of the dielectric structure to the base substrate overlaps at least a part of a projection of the first electrode structure and the second electrode structure to the base substrate;
the base substrate is reused as an encapsulation layer of the display structure,
wherein the dielectric structure includes a first dielectric substructure and a second dielectric substructure;
a projection of the first dielectric substructure to the base substrate overlaps a part of the projection of the first electrode structure and the second electrode structure to the base substrate;
a projection of the second dielectric substructure to the base substrate overlaps a projection of an interval between the first electrode structure and the second electrode structure to the base substrate,
wherein a dielectric constant of the second dielectric substructure is greater than a dielectric constant of the first substructure.

13. The display device of claim 12, wherein the display structure includes a backlight source, a liquid crystal module, and the encapsulation layer that are sequentially stacked; the first conductive structure and the liquid crystal module are at opposite sides of the encapsulation layer.

14. The display device of claim 12, wherein the display structure includes an anode layer, a light emitting layer, a cathode layer, and the encapsulation layer that are sequentially stacked; the first conductive structure and the cathode layer are at opposite sides of the encapsulation layer.

15. The display device of claim 12, wherein at least one of the first electrode structure and the second electrode structure is a mesh electrode structure; a hollow portion of the mesh electrode structure is corresponding to at least one sub-pixel aperture of the display panel.

16. The display device of claim 15, wherein the first dielectric substructure is a mesh dielectric substructure;
a width of any mesh line of the mesh dielectric substructure is not less than 0.1 times a width of a corresponding mesh line of the mesh electrode structure, and is not greater than a distance between two adjacent sub-pixel apertures;
at least part of the projection of the second dielectric substructure to the base substrate overlaps a projection of at least one sub-pixel aperture to the base substrate.

17. A touch panel, comprising:
a base substrate;
a first conductive structure on the base substrate; and
a dielectric structure on the first conductive structure;
wherein the first conductive structure includes: a first electrode structure and a second electrode structure that are spaced apart from each other;
a projection of the dielectric structure to the base substrate overlaps at least a part of a projection of the first electrode structure and the second electrode structure to the base substrate,
wherein the dielectric structure includes a first dielectric substructure and a second dielectric substructure;
a projection of the first dielectric substructure to the base substrate overlaps a part of the projection of the first electrode structure and the second electrode structure to the base substrate;
a projection of the second dielectric substructure to the base substrate overlaps a projection of an interval between the first electrode structure and the second electrode structure to the base substrate,
wherein an overlap ratio of the projections of the first dielectric substructure and the first electrode structure to the base substrate is not less than 0.1 and not greater than 0.9.

* * * * *